United States Patent [19]
Lin

[11] Patent Number: 6,112,742
[45] Date of Patent: Sep. 5, 2000

[54] BARBECUE GRILL DEVICE

[76] Inventor: Jung-Chun Lin, No. 2, Alley 402, Lane 68, Yung Yuan Road, Feng Yuan City, Taichung Hsien, Taiwan

[21] Appl. No.: 09/277,153

[22] Filed: Mar. 26, 1999

[51] Int. Cl.⁷ .................................................. A21B 1/00
[52] U.S. Cl. ............................ 126/273 E; 126/41 R; 126/41 D; 126/275 R
[58] Field of Search ....................... 126/273 E, 41 R, 126/41 D, 275 R

[56] References Cited

U.S. PATENT DOCUMENTS 2,622,186 12/1952 Hutchens ........................... 126/275 E
2,748,690 6/1956 Lipsich et al. ..................... 126/275 E
2,817,744 12/1957 Free ................................... 126/275 E

*Primary Examiner*—Larry Jones
*Attorney, Agent, or Firm*—Charles E. Baxley, Esq.

[57] ABSTRACT

A barbecue grill device includes two grill plates each are supported by a frame and the two grill plates are pivotally connected with each other so that the two grill plates are overlapped together. One of the grill plates has two flanges extending from two ends thereof and the other grill plate has two flanges extending from two ends thereof. When the second grill plate is overlapped on the first grill plate, the flanges on the first grill plate and the second grill plate are located side by side so as to reduce the total thickness of the overlapped grill plates.

4 Claims, 4 Drawing Sheets

BARBECUE GRILL DEVICE

FIELD OF THE INVENTION

The present invention relates to a barbecue grill device, and more particularly, to a barbecue grill device having two sets of grille units pivotally connected with each other. Each of the grill plates has two flanges extending therefrom which are so located that the two grill plates can be overlapped with the flanges arranged side by side to have a compact size.

BACKGROUND OF THE INVENTION

A conventional barbecue grill device 1 used in home is shown in FIG. 1 and comprises a metal grill pan 11 which is received in a non-conductive supporting frame 10 made of plastic material or ceramic. The barbecue grill device 1 has a heating means (not shown) received between the supporting frame 10 and the bottom of the grill pan 11 so that when plugging with the electric power source, the grill pan 11 is heated and food can be processed on the top surface thereof. A cover 12 is equipped to cover the grill pan 11 to prevent smoke or grease particles jumping from the barbecue grill device 1 and contaminate the users. The home-use barbecue grill device 1 provides only a very limited area for the processing the food so that it takes time to serve the food. Furthermore, the volume of the whole barbecue grill device 1 is so big that it occupies a large space in the closet. Accordingly, generally, only one barbecue grill device 1 is bought in a home.

The present invention intends to provide a barbecue grill device having two grill plates and the grill plates can be overlapped with each other in a compact way so that the barbecue grill device of the present invention provides two times of grilling area relative to the conventional grill device and the device can be folded to be a small size which is convenient for storage.

SUMMARY OF THE INVENTION

In accordance with one aspect of the present invention, there is provided a barbecue grill device comprising a first grill plate having a side wall extending from the periphery thereof and an opening defined through the side wall. A first flange and a second flange respectively extend from the first grill plate. A second grill plate has a side wall extending from the periphery thereof and an opening is defined through the side wall. A third flange and a fourth flange respectively extend from the second grill plate which is pivotally connected to the first grill plate by a pivotal member so that when the second grill plate is overlapped on the first grill plate, the first flange is received between the fourth flange and the side wall on the second grill plate, and the third flange is received between the second flange and the side wall of the first grill plate.

It is an object of the present invention to provide a barbecue grill device having a larger area to treat food thereon.

It is another object of the present invention to provide a barbecue grill device which can be folded to have a compact size.

It is yet another object of the present invention to provide a barbecue grill device wherein food can be treated between the two grill plates of the device.

Further objects, advantages, and features of the present invention will become apparent from the following detailed description with appropriate reference to the accompanying drawings.

DETAILED DESCRIPTION OF THE PREFERRED EMBODIMENT

Figure 1:
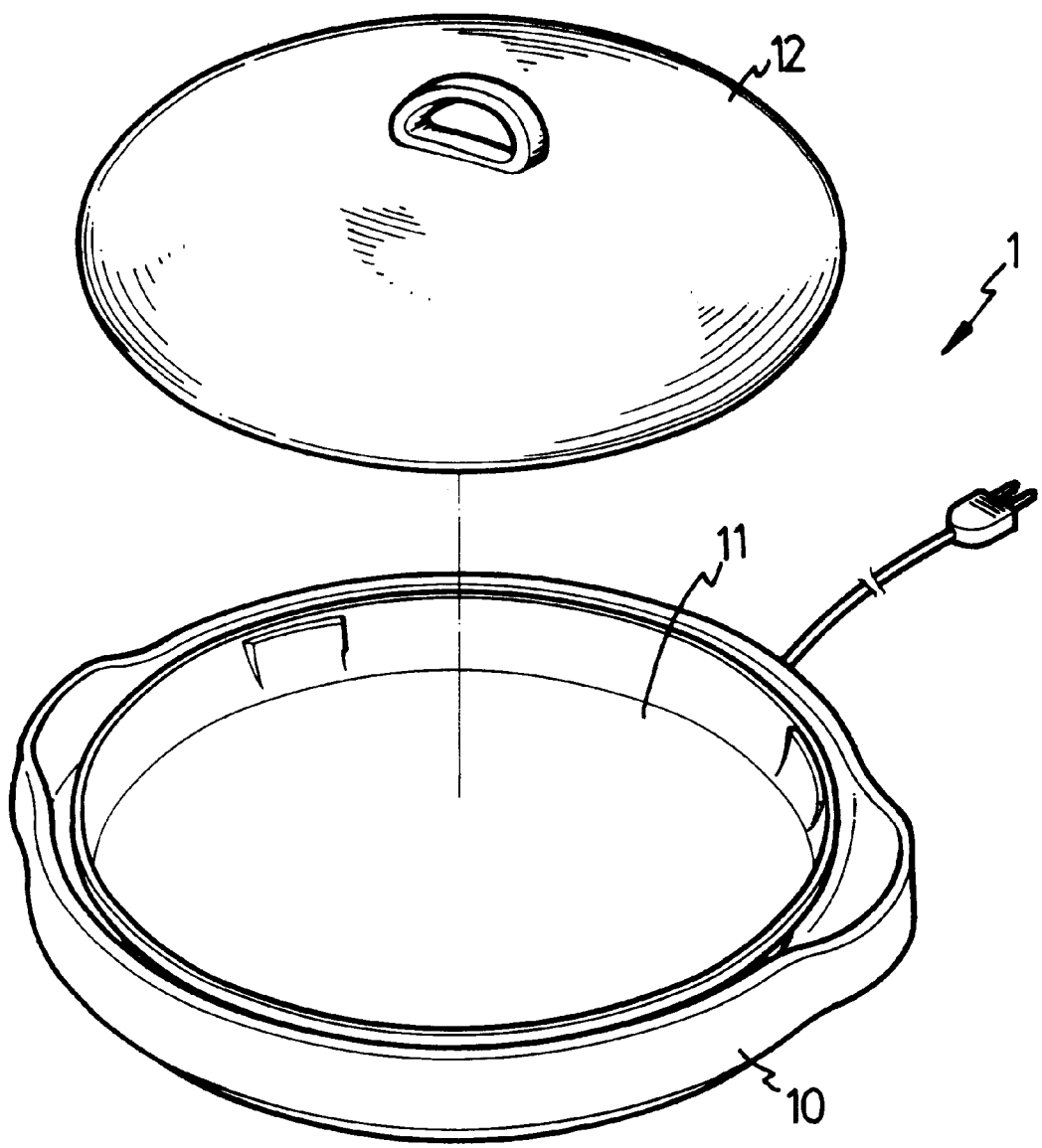
FIG. 1 is an exploded view of a conventional barbecue grill device.
Figure 2:
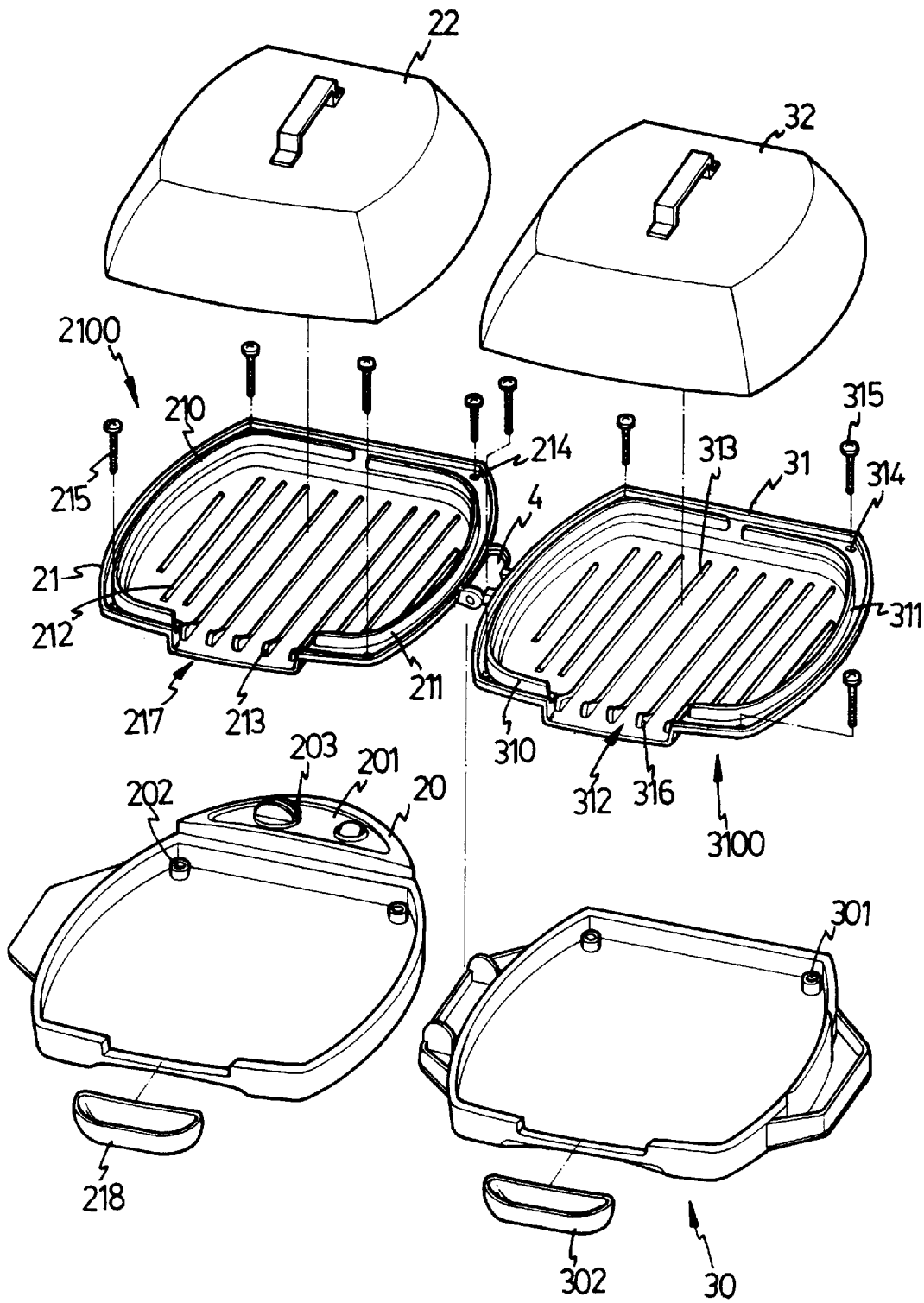
FIG. 2 is an exploded view of the barbecue grill device in accordance with the present invention.
Figure 3:
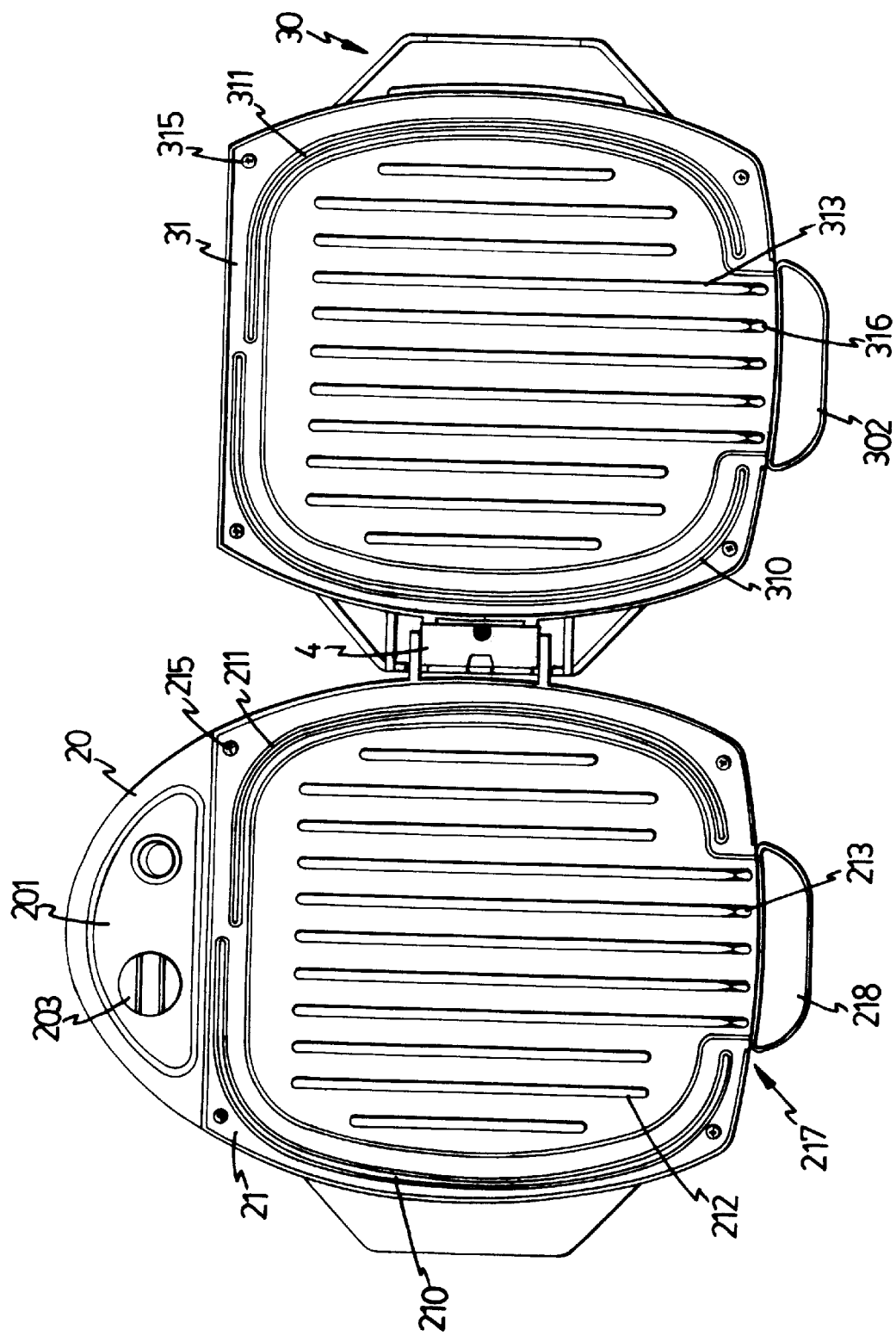
FIG. 3 is a top view to show the two grill plates barbecue grill device pivotally connected together with each other.

Referring to FIGS. 2 and 3, the barbecue grill device in accordance with the present invention comprises a first grill plate 2100 having a side wall 21 extending from the periphery thereof and an opening 217 defined through the side wall 21. A first flange 210 and a second flange 211 respectively extend from the first grill plate 2100. A plurality of ridges 212 extend from the first grill plate 2100 and a plurality of protrusions 213 extend from some of the ridges 212 wherein the protrusions 213 are located in the opening 217. The first grill plate 2100 is supported by a first frame 20 which has a control panel 201 on which a switch means 203 is connected so as to control the heating means (not shown) attached to the bottom of the first grill plate 2100. The first grill plate 2100 has four holes 214 defined therethrough and the first frame 20 has four tubular members extending (only two are shown) therefrom each having a threaded recess 202. The holes 214 in the first grill plate 2100 are located in alignment with the threaded recesses 202 in the first frame 20 so that bolts 215 respectively extend through the holes 214 and engaged with the threaded recesses 202 to connect the first grill plate 2100 and the first frame 20. An oil collecting box 218 is connected to the first grill plate 2100 and communicates with the opening 217 so as to collect the debris of food and oil via the opening 217.

A second grill plate 3100 has a heating means (not shown) attached to the bottom thereof and a side wall 31 extending from the periphery thereof and an opening 312 defined through the side wall 31. A third flange 310 and a fourth flange 311 respectively extend from the second grill plate 3100. A plurality of ridges 312 extend from the second grill plate 3100 and a plurality of protrusions 316 extend from some of the ridges 313 wherein the protrusions 316 are located in the opening 312. The second grill plate 3100 is supported by a second frame 30 which is pivotally connected to the first frame 20. The second grill plate 3100 has four holes 314 defined therethrough and the second frame 30 has four tubular members extending (only two are shown) therefrom each having a threaded recess 301. The holes 314 in the second grill plate 3100 are located in alignment with the threaded recesses 301 in the second frame 30 so that bolts 315 respectively extend through the holes 314 and engaged with the threaded recesses 301 to connect the second grill plate 3100 and the second frame 30. Another oil collecting box 302 is connected to the second grill plate 3100 and communicates with the opening 312 so as to collect the debris of food and oil via the opening 312.

Figure 4:
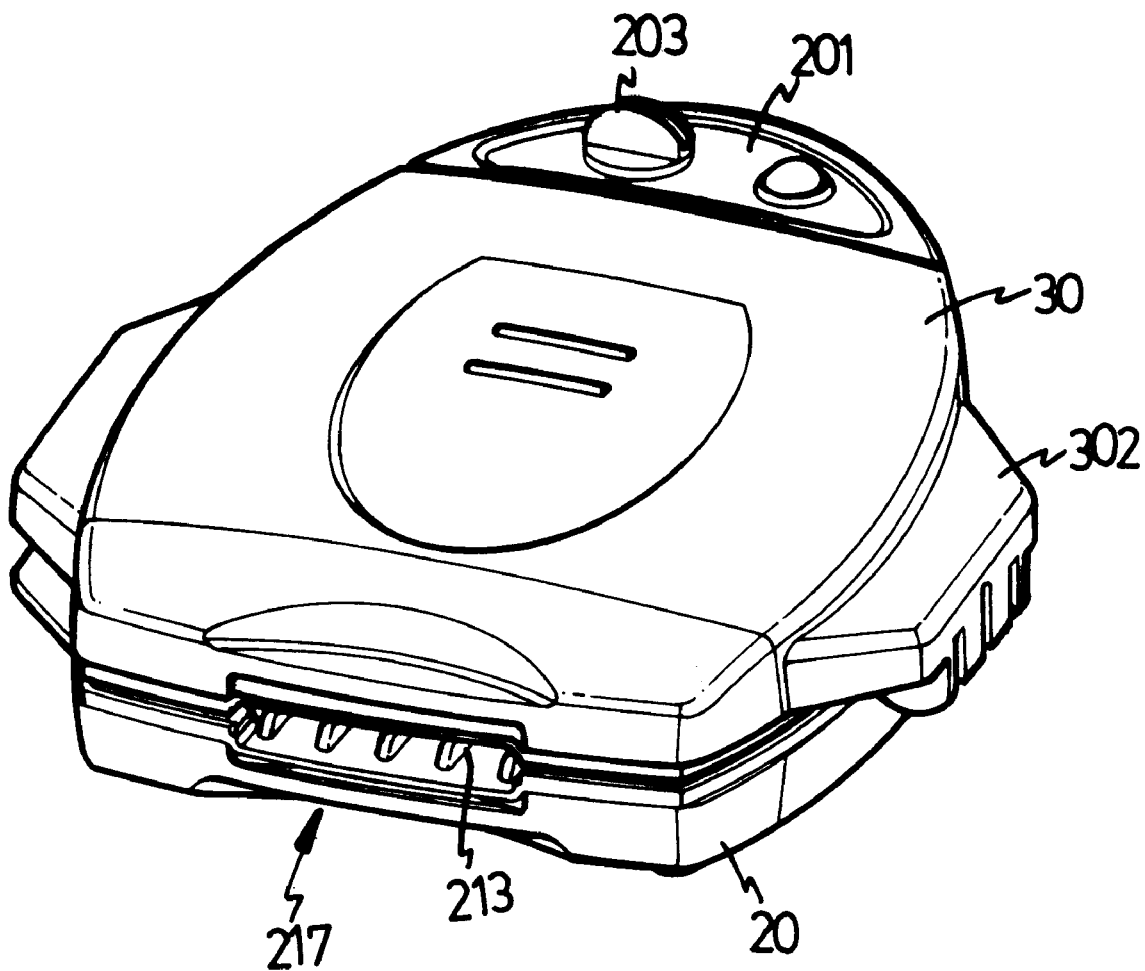
FIG. 4 is a perspective view of the barbecue grill device in accordance with the present invention when the two grill plates are overlapped together.

The first grill plate 2100 is connected to the second grill plate 3100 by a pivotal member 4 so that when the second grill plate 3100 is able to be overlapped on the first grill plate 2100. When overlapping the second grill plate 3100 to the first grill plate 2100, the first flange 210 is received between the fourth flange 311 and the side wall 31 on the second grill plate 3100, and the third flange 310 is received between the second flange 211 and the side wall 21 of the first grill plate 2100 so that the total thickness of the overlapped first grill plate 2100 and the second grill plate 3100 is very limited as shown in FIG. 4.

The barbecue grill device of the present invention has two grill plates 2100, 3100 so as to treat more food in the same time and when the second grill plate 3100 is overlapped on the first grill plate 2100, the food can be sandwiched between the two grill plates 2100, 3100 so as the be heated on the both sides of the food. Each of the two grill plates 2100, 3100 may covered by a cover 22, 32 when treating the food. The device can be folded to have a compact size so as to be conveniently stored or received in a closet.

The invention is not limited to the above embodiment but various modification thereof may be made. It will be understood by those skilled in the art that various changes in form and detail may made without departing from the scope and spirit of the present invention.

What is claimed is:

1. A barbecue grill device comprising:

a first grill plate having a side wall extending from the periphery thereof and an opening defined through said side wall, a first flange and a second flange respectively extending from said first grill plate, said first grill plate having a plurality of holes defined therethrough and said first grill plate supported by a first frame, a plurality of tubular members extending from said first frame and each tubular member having a threaded recess, and a second grill plate having a side wall extending from the periphery thereof and an opening defined through said side wall, a third flange and a fourth flange respectively extending from said second grill plate, said second grill plate having a plurality of holes defined therethrough and said second grill plate supported by a second frame, a plurality of tubular members extending from said second frame and each tubular member having a threaded recess, said first grill plate connected to said second grill plate by a pivotal member, said holes in said first grill plate located in alignment with said threaded recesses in said first frame, bolts extending through said holes in said first grill plate and engaged with said threaded recesses in said first frame, said holes in said second grill plate located in alignment with said threaded recesses in said second frame, bolts extending through said holes in said second grill plate and engaged with said threaded recesses in said second frame, so that when said second grill plate is overlapped on said first grill plate, said first flange is received between said fourth flange and said side wall on said second grill plate, and said third flange is received between said second flange and said side wall of said first grill plate.

2. The barbecue grill device as claimed in claim 1 further comprising two oil collecting boxes respectively connected to said first grill plate and said second grill plate, said two oil collecting boxes respectively communicating with said two openings.

3. The barbecue grill device as claimed in claim 1, wherein each of said first grill plate and said second grill plate has a plurality of ridges extending therefrom.

4. The barbecue grill device as claimed in claim 1 further comprising a plurality of protrusions extending from said first grill plate and located in said opening, a plurality of protrusions extending from said second grill plate and located in said opening.

* * * * *